(12) United States Patent
Lee et al.

(10) Patent No.: US 8,405,541 B2
(45) Date of Patent: Mar. 26, 2013

(54) MULTI-RANGE RADAR SYSTEM

(75) Inventors: Jae Seung Lee, Ann Arbor, MI (US); Paul D. Schmalenberg, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 238 days.

(21) Appl. No.: 12/874,040

(22) Filed: Sep. 1, 2010

(65) Prior Publication Data
US 2012/0050092 A1 Mar. 1, 2012

(51) Int. Cl.
*G01S 13/08* (2006.01)
(52) U.S. Cl. ............... 342/118; 342/128; 342/145
(58) Field of Classification Search ........... 342/118–146
See application file for complete search history.

(56) References Cited

U.S. PATENT DOCUMENTS

| | | | | |
|---|---|---|---|---|
| 3,017,630 A | * | 1/1962 | Begovich et al. | 342/157 |
| RE28,217 E | * | 10/1974 | Malech | 343/754 |
| 4,614,317 A | * | 9/1986 | Stavis | 244/3.19 |
| 5,757,307 A | | 5/1998 | Nakatani et al. | |
| 5,942,688 A | * | 8/1999 | Kimura et al. | 73/598 |
| 7,504,988 B2 | | 3/2009 | Tsuchihashi et al. | |
| 7,626,536 B1 | | 12/2009 | Rihaczek et al. | |
| 7,675,460 B2 | | 3/2010 | Sanada | |
| 2007/0052580 A1 | * | 3/2007 | Fiore | 342/133 |
| 2008/0042482 A1 | | 2/2008 | Weiss et al. | |
| 2008/0117098 A1 | | 5/2008 | Johnson et al. | |
| 2010/0033364 A1 | | 2/2010 | Kishida et al. | |
| 2010/0045482 A1 | * | 2/2010 | Strauss | 340/903 |
| 2010/0103023 A1 | | 4/2010 | Ogawa | |

FOREIGN PATENT DOCUMENTS

EP   1906206 A1   9/2007

* cited by examiner

*Primary Examiner* — Timothy A Brainard
(74) *Attorney, Agent, or Firm* — Gifford, Krass, Sprinkle, Anderson & Citkowski, P.C.

(57) ABSTRACT

A radar system operable to detect objects within multiple ranges using common components is provided. The radar system includes a transmitter antenna, a first and second microwave radiation source, and a receiver. The first and second microwave radiation sources both are transmitted through the transmitter antenna. The echoes are received by the same receiver. The first microwave radiation source is a frequency modulated wave form and the second microwave radiation source is an ultra-wide band wave form. A multiplexer selectively connects one of the first and second microwave radiation sources to the transmitter antenna.

16 Claims, 4 Drawing Sheets

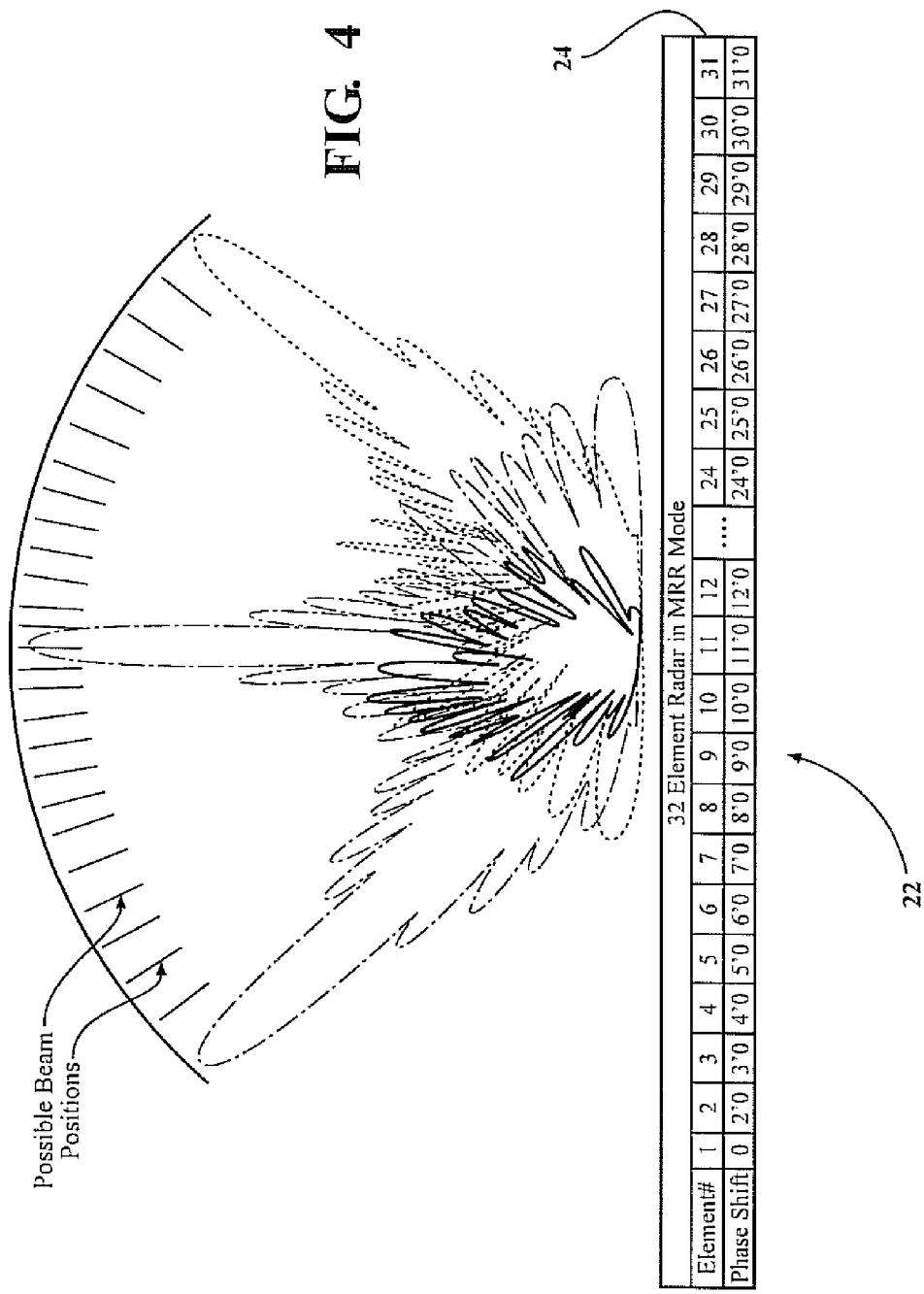

MULTI-RANGE RADAR SYSTEM

FIELD OF THE INVENTION

The invention relates to a radar system operable to detect multiple ranges using shared components.

BACKGROUND OF THE INVENTION

Current radar systems operating at the microwave range may be classified into long range narrow angle detection systems or short range wide angle detection systems. The long range radar systems have a relatively narrow beam. Accordingly, long range radar systems are not as effective for detecting objects within a relatively short distance as opposed to short range wide angle systems which have a wider angle. Conversely, short range systems are not able to detect objects in a relatively long distance from the antenna as such systems lack the power to reach such distances.

Automotive vehicles integrating long range and short range detection systems currently implement two different radar systems. Each of the radar systems includes its own microwave radiation source, transmitting antenna and receiver element. This adds to the cost of manufacture.

Accordingly, it remains desirable to have a radar system operable to detect objects within both a long range and short range distance of the platform without incurring the cost associated with using separate and distinct receiver elements and antennas for respective long, short and intermediate range system.

SUMMARY OF THE INVENTION

According to one aspect of the invention, a multi-range radar system for use in a platform such as an automobile is provided. The multi-range radar system may be mounted to the automobile and detects objects within a short range, intermediate range, and long range of the automobile. The multi-range radar system includes a transmitter antenna for transmitting microwave radiation.

A first microwave radiation source and second microwave radiation source are transmitted through the transmitter antenna. The first microwave radiation source is preferably a frequency modulated continuous wave and is operable to detect objects within an intermediate, or long range distance of the transmitter antenna.

The second microwave radiation source is preferably an ultra-wide band waveform operable to detect objects within a short range of the transmitter antenna. The ultra-wide band waveform has a wider field of view than the frequency modulated continuous wave.

A multiplexer is in electrical communication with the first and second microwave radiation sources, and the transmitter antenna. The multiplexer selectively connects one of the first and second microwave radiation sources to the transmitter antenna. The transmitter antenna transmits a frequency modulated wave or an ultra-wide band wave.

A receiver receives an echo from either the first and/or second microwave radiation source.

A processor receives signals from the receiver and processes the signals so as to determine the location of a detected object.

BRIEF DESCRIPTION OF THE DRAWINGS

Advantages of the present invention will be readily appreciated as the same becomes better understood by reference to the following detailed description when considered in connection with the accompanying drawings wherein:

FIG. 4 is a diagram of the receiver elements processing signals from the first microwave radiation source wherein the phase shift for each of the receiver elements is different than the other.

DETAILED DESCRIPTION OF THE INVENTION

Figure 1:
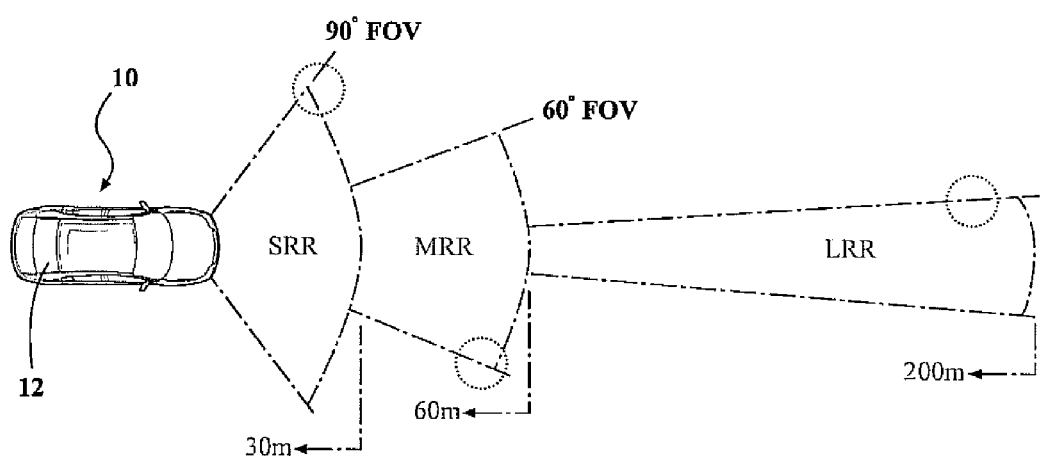
FIG. 1 is a perspective view of the different detection zones of a multi-range radar system of the present invention mounted on an automobile.

With reference first to FIG. 1, a multi-range radar system 10 is shown mounted to an automotive vehicle 12. The multi-range radar system 10 is operable to detect objects within various distances and fields of view of the vehicle 12. In particular, the multi-range radar system 10 is operable to detect objects within a short range, intermediate range, and long range distance of the vehicle 12. The multi-range radar system 10 utilizes the advantages of various microwave radiation sources so as to provide accurate tracking and object detection within various ranges of the host vehicle 12.

Figure 2:
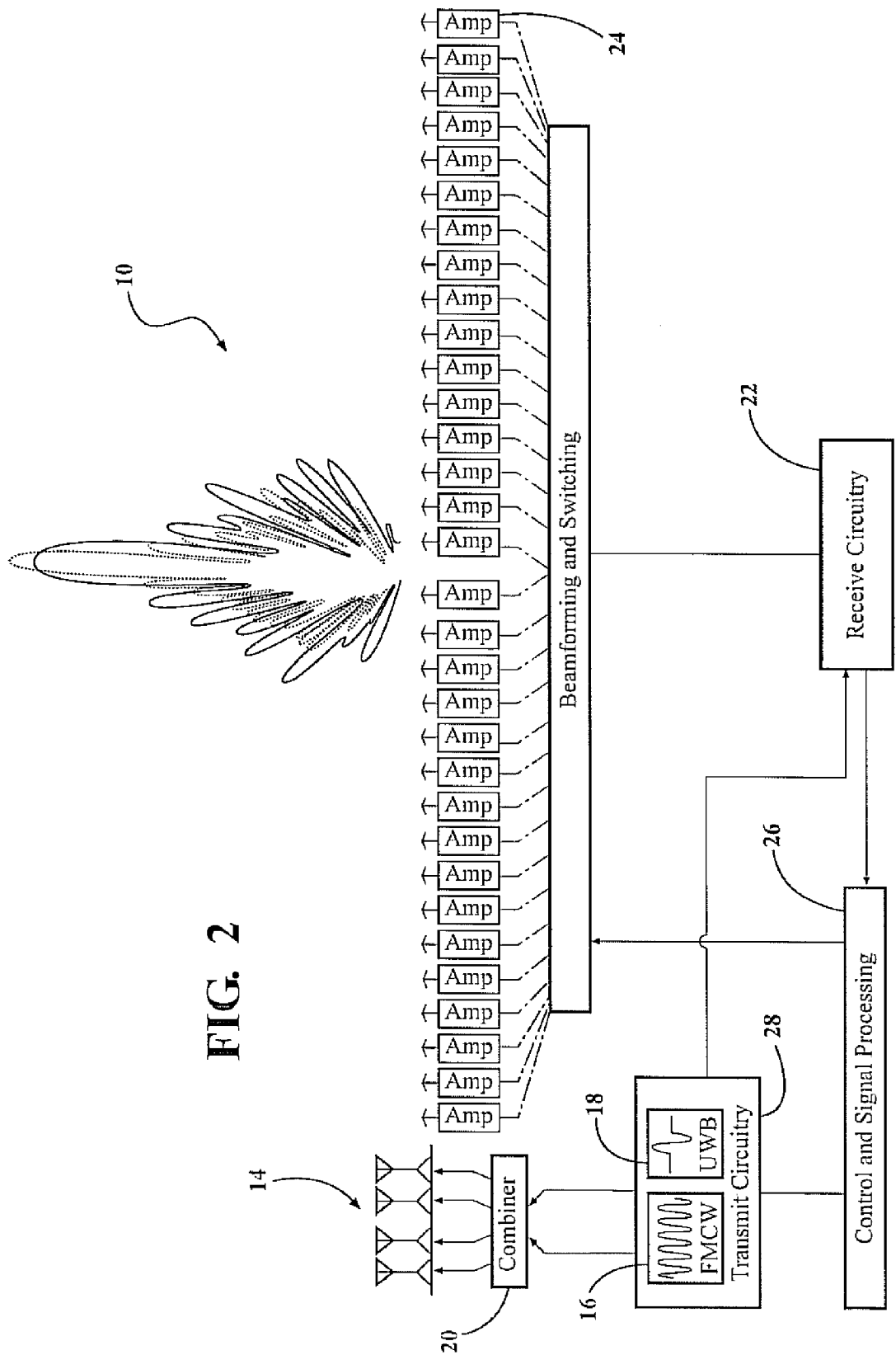
FIG. 2 is an illustrative view of the components of the multi-range radar system of the present invention showing a transmitting antenna, the first and second microwave radiation sources, and the receiver.

With reference now to FIG. 2, the components of the multi-range radar system 10 of the present invention are shown. The multi-range radar system 10 includes a transmitter antenna 14. Preferably the transmitter antenna 14 is a single radiator element operable to transmit microwave radiation.

The radar system 10 further includes a first microwave radiation source 16 and a second microwave radiation source 18. The first microwave radiation source 16 is different than the second microwave radiation source 18. Preferably, the first microwave radiation source 16 is a frequency modulated continuous wave (PMCW) form. The second microwave radiation source 18 is an ultra-wide band wave form. The first and second microwave radiation sources 16, 18 may be pulsed or transmitted continuously.

A multiplexer 20 has two inputs electrically connected to the first and second microwave radiation sources 16, 18, and an output connected to the transmitter antenna 14. The multiplexer 20 selectively connects one of the first and second microwave radiation sources 16, 18 to the transmitter antenna 14. Thus, the transmitter antenna 14 alternatively transmits a frequency modulated continuous wave form or an ultra-wide band wave form.

A receiver 22 receives echoes from the transmitted wave forms. The receiver may include a plurality of radiator elements 24. Preferably, the radiator elements 32 are axially aligned so as to form an array. Each radiator element's 24 gain and phase may be controlled independently. Thus, the radar system 10 may be operable to perform azimuth scanning, three beam tracking monopulse operations, and beam width control. The receiver 22 converts the echoes in to a signal.

A processor 26 is electrically connected to the receiver 22 and the multiplexer 20. The processor 26 is receives the signals from the receiver 22 and process the signals so as to determine the location of a detected object. The processor 26 is also electrically coupled to the multiplexer 20. The processor 26 communicates to the multiplexer 20 and determines which of the first and second microwave radiation sources 16, 18 is transmitted through the transmitter antenna 14. The processor 26 is further operable to control the first microwave radiation source 16, so as to generate a desired waveform operable to detect objects within an intermediate or long range distance of the transmitter antenna 14.

An amplifier 28 is coupled to the first and second microwave radiation sources 16, 18. The amplifier 28 controls the power provided to the first and second microwave radiation sources 16, 18. More power is supplied to the first microwave radiation source 16 than the second microwave radiation source 18. Thus, the system 10 is able to perform object detection within various ranges.

Figure 3:
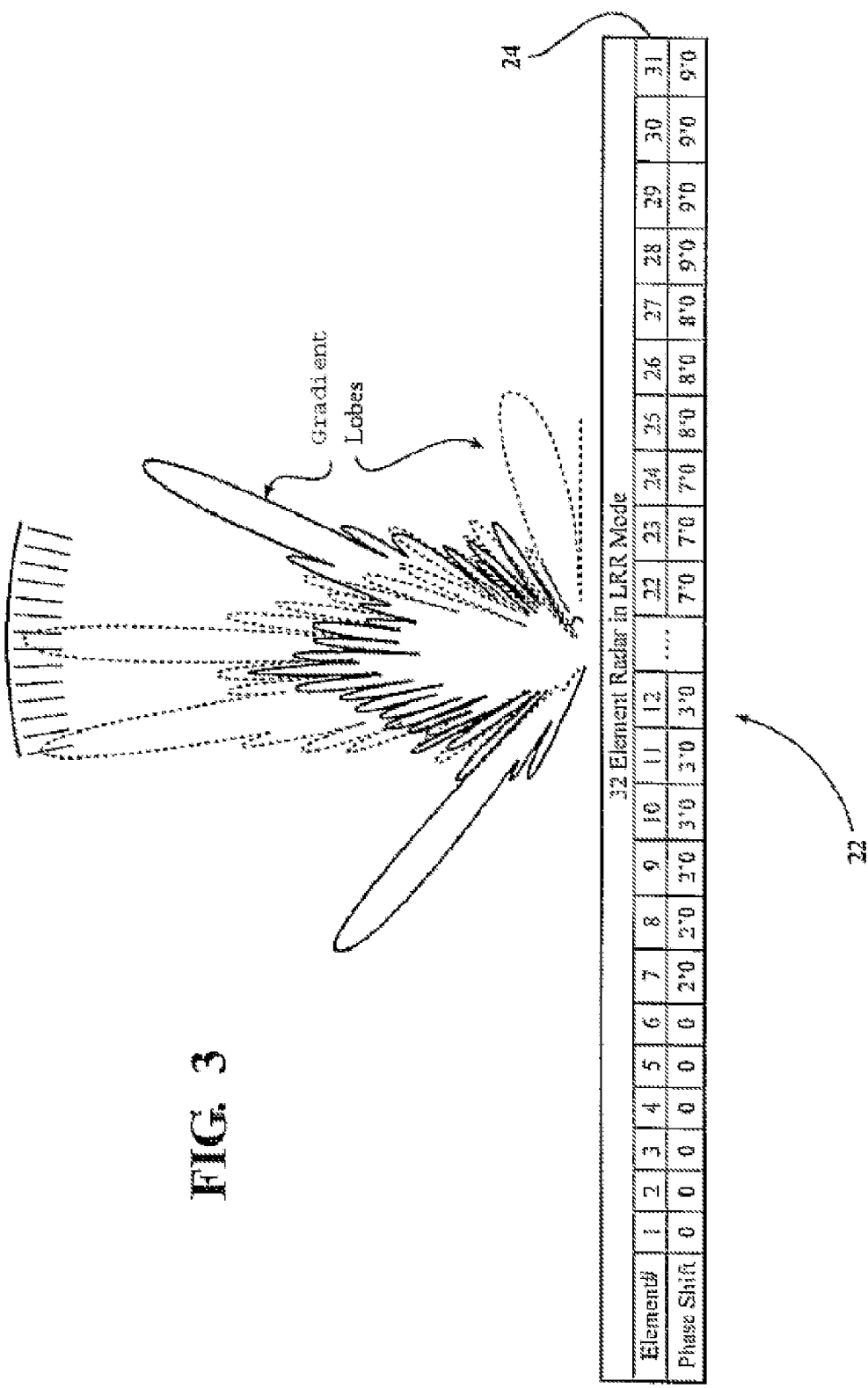
FIG. 3 is a perspective view of the receiver elements processing echoes from the first microwave radiation source.

With reference now to FIGS. 3 and 4, the operation of the radar system 10 in the long range and intermediate range is provided. For illustrative purposes, the intermediate range is shown as being between thirty and sixty meters of the transmitter antenna 14 and the long range is shown to be between sixty and two hundred meters of the antenna. The short range is shown to be thirty meters in front of the transmitter antenna 14.

For illustrative purposes, the multiplexer alternatively transmits either the first or second microwave radiation sources 16, 18 through the transmitter antenna 14. The processor 26 is provided with the mode of transmission and tunes the receiver 22 to process respective first and second microwave sources 16, 18. However, it should be appreciated that the radar system 10, may transmit both first and second microwave radiation sources 16, 18 through the transmitter antenna 14 simultaneously, and the processor may be tuned to receive respective first and second microwave radiation sources 16, 18 at predetermined intervals.

With reference first to FIG. 3, the operation of the long range radar detection mode is provided. The first microwave radiation source 16 is transmitted through the transmitter antenna 14. Preferably, the first microwave radiation source emits a microwave between approximately 76 and 81 gigahertz.

In the long range mode, the radar system 10 is programmed to scan a relatively small angular cone in front of the antenna. Specifically, the radar system is operable to provide a scan of 20 degrees out to a distance of 200 meters from the transmitter antenna 14. This is desirable when performing object detection and tracking in environments such as a road as a large scan angle would return signals reflected from buildings and trees that are far off the road.

As shown in FIG. 3, adjacent radiator elements 24 are set to equal phase shifts. In particular, the plurality of radiator elements 24 is grouped into a predetermined number of elements. For illustrative purposes, the three elements are placed in a group. The controller is operable to actuate the phase shifter so as to actuate a predetermined phase shift on each of the groups a predetermined number of elements. The first three elements are shown having no phase shift while the following three elements are given a wavelength phase shift. Thus, some of the beam positions may be refined.

As shown, the operation of the radar system 10 may introduce gradient lobes as a result of tying together of elements. It is understood by those skilled in the art that these gradient lobes may be reduced by using blocking structures on the radar or by reducing the amount of elements tied together, that is by making the groups into larger numbers of elements. Though a receiver 22 having thirty-two radiator elements 24 is shown, it should be appreciated by those skilled in the art that the number of radiator elements 24 may be changed for packaging or cost reasons.

With reference now to FIG. 4, the operation of the radar system 10 in the medium range mode is provided. A wider beam angle is desired in the medium range operation. In particular, the radar system 10 is configured to provide a 60 degree scan out to 60 meters from the transmitter antenna 14. The receiver actuates a unique phase shift for each respective radiator element 24. Naturally, the effect is that the beam positions become coarser with respect to the operation in the long range radar mode. The processor 26 may be operable to tie elements together during critical detection times when finer control over the beam tilt is necessary.

In the short range mode of operation, the radar system 10 transmits the second microwave radiation source 18 through the transmitter antenna 14. Preferably, the second radiation source is operable to transmit a microwave between approximately 79 and 81 gigahertz. The second microwave radiation source 18 is preferably an ultra wideband waveform.

The invention has been described in an illustrative manner. It is therefore to be understood that the terminology used is intended to be in the nature of the words of description rather than limitation. Many modifications and variations of the invention are possible in light of the above teachings. For example, the first microwave radiation source 16 is described as being a frequency modulated continuous waveform. However, those skilled in the art will appreciated that other waveforms, such as a monopulse wave form may be possible. Thus within the scope of the appended claims the invention may be practiced other than as specifically described.

We claim:

1. A multi-range radar system comprising:
   a transmitter antenna;
   a first microwave radiation source operatively connected to the transmitter antenna, the first microwave radiation source configured to detect an object within a first range;
   a second microwave radiation source operatively connected to the transmitter antenna, the second microwave radiation source different than the first microwave radiation source. the second microwave radiation source configured to detect an object within a second range, the second range different than the first range;
   a multiplexer operable to selectively connect the first and second microwave radiation source to the antenna so as to transmit the first and second microwave radiation source through the transmitter antenna independently or simultaneously;
   a receiver operable to receive an echo from the first and second microwave radiation source; and
   a processor operable to receive a echo from the receiver and processing the echo so as to determine the location of a detected object.

2. The multi-range radar system as set forth in claim 1, the wherein the first microwave radiation source is a mono-pulse wave form.

3. The multi-range radar system as set forth in claim 1, wherein the first microwave radiation source is a frequency modulated continuous wave form.

4. The multi-range radar system as set forth in claim 1, wherein the receiver includes a plurality of elements.

5. The multi-range radar system as set forth in claim 4, further including a phase shifter, wherein the plurality of elements are grouped into a predetermined number of elements, the processor further operable to actuate the phase shifter so as to effect a predetermined phase shift on each of groups of predetermined number of elements.

6. The multi-range radar system as set forth in claim 5, wherein the processor is further operable to independently control the gain and phase so as to generate a selected azimuth scanning, object tracking, and beam width.

7. The multi-range radar system as set forth in claim 5, further including a phase shifter operable to generate a unique phase shift for each of the plurality of elements.

8. The multi-range radar system as set forth in claim 7, further including a switch circuit interconnecting the porocessor to each of the elements in the predetermined number of elements, the processor operable to actuate the switch so as to selectively actuate each of the groups of predetermined number of elements.

9. The multi-range radar system as set forth in claim 8, further including an amplifier interconnecting the processor to each of the receivers in a group of receivers, the processor operable to actuate the second switch so as to selectively actuate each of the receivers in the group of receivers.

10. The multi-range radar system as set forth in claim 1, wherein the first microwave radiation source is operable to detect objects within an intermediate range, and a long range.

11. The multi-range radar system as set forth in claim 10 wherein the intermediate range is between thirty and sixty meters of the antenna, and long range is between sixty meters and two-hundred meters of the antenna.

12. The multi-range radar system as set forth in claim 11, wherein the intermediate range covers a field of view of sixty degrees from the direction of the antenna, and the long range covers a field of view of twenty degrees from the direction of the antenna.

13. The multi-range radar system as set forth in claim 10, wherein the first microwave radiation source transmits a microwave between 76 and 81 gigahertz.

14. The multi-range radar system as set forth in claim 1, wherein the second microwave radiation source is operable to detect objects within a short range.

15. The multi-range radar system as set forth in claim 14, wherein the second microwave radiation source is an ultra-wide band wave form is operable to detect an object within thirty meters of the antenna, and has a ninety degree field of view.

16. The multi-range radar system as set forth in claim 14, wherein the second microwave radiation source is transmits a microwave between 79 and 81 giga-hertz.

\* \* \* \* \*